(12) United States Patent
Hesselbrock et al.

(10) Patent No.: US 11,013,360 B2
(45) Date of Patent: May 25, 2021

(54) APPARATUS AND METHOD FOR PREPARING A BREWED BEVERAGE

(71) Applicant: MELITTA SINGLE PORTIONS GMBH & CO. KG, Minden (DE)

(72) Inventors: Katrin Hesselbrock, Osnabrueck (DE); Sven Neuhaus, Bad Oeynhausen (DE); Jan Pahnke, Minden (DE); Gerold Schandl, Minden (DE); Robert Köhler, Ober-Ramstadt (DE); Markus Ungerer, Mühltal (DE); Thomas Weber, Mühltal (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 0 days.

(21) Appl. No.: 15/325,715

(22) PCT Filed: Jun. 3, 2015

(86) PCT No.: PCT/EP2015/062361
§ 371 (c)(1),
(2) Date: Jan. 11, 2017

(87) PCT Pub. No.: WO2016/005112
PCT Pub. Date: Jan. 14, 2016

(65) Prior Publication Data
US 2017/0150844 A1 Jun. 1, 2017

(30) Foreign Application Priority Data
Jul. 11, 2014 (DE) ..................... 10 2014 109 761.0

(51) Int. Cl.
*A47J 31/36* (2006.01)
*A23F 3/18* (2006.01)
(Continued)

(52) U.S. Cl.
CPC ............. *A47J 31/3633* (2013.01); *A23F 3/18* (2013.01); *A47J 31/3638* (2013.01);
(Continued)

(58) Field of Classification Search
CPC .. A47J 31/3635; A47J 31/3638; A47J 31/407; A47J 31/44; A47J 31/54; A47J 31/60; A47J 31/3633; A23F 3/18
(Continued)

(56) References Cited

U.S. PATENT DOCUMENTS

| 4,975,296 A | 12/1990 | Newman et al. |
| 5,303,639 A | 4/1994 | Bunn et al. |

(Continued)

FOREIGN PATENT DOCUMENTS

| CN | 201282920 Y | 8/2009 |
| CN | 101832121 A | 9/2010 |

(Continued)

OTHER PUBLICATIONS

English Translation of German Search Report for DE 10 2014 109 761.0, dated Mar. 10, 2015.
(Continued)

*Primary Examiner* — Justin C Dodson
(74) *Attorney, Agent, or Firm* — FisherBroyles, LLP; Robert Kinberg (57) ABSTRACT

An apparatus for preparing a brewed beverage includes a device for heating and conveying water. A brewing chamber is coupled to the device to introduce heated water into the brewing chamber. The brewing chamber has a lateral opening and a bottom side having an outlet. A positioning device positions at the lateral opening of the brewing chamber a capsule containing an ingredient for brewing the beverage. A drive device is arranged to move the brewing chamber relative to the capsule. A method of using the apparatus
(Continued)

includes the step of ejecting the capsule from the lateral opening of the brewing chamber after each brewing process and carrying out an automatic rinsing of the brewing chamber.

14 Claims, 10 Drawing Sheets

(51) Int. Cl.
*A47J 31/40* (2006.01)
*A47J 31/54* (2006.01)
*A47J 31/60* (2006.01)
*A47J 31/44* (2006.01)

(52) U.S. Cl.
CPC .............. *A47J 31/407* (2013.01); *A47J 31/44* (2013.01); *A47J 31/54* (2013.01); *A47J 31/60* (2013.01)

(58) Field of Classification Search
USPC ..... 99/294–301, 302 R; 426/77, 78, 79, 115, 426/232, 433
See application file for complete search history.

(56) References Cited

U.S. PATENT DOCUMENTS

| | | |
|---|---|---|
| 7,681,491 B2 | 3/2010 | Agon et al. |
| 8,091,469 B2 | 1/2012 | Cahen et al. |
| 8,178,139 B2 | 5/2012 | Versini |
| 8,210,097 B2 | 7/2012 | Versini |
| 8,512,784 B2 | 8/2013 | Denisart et al. |
| 8,734,874 B1 | 5/2014 | Paolone |
| 9,382,063 B2 | 7/2016 | Van Belleghem et al. |
| 10,383,473 B2 | 8/2019 | Hesselbrock et al. |
| 10,405,691 B2 | 9/2019 | Hesselbrock et al. |
| 10,420,438 B2 | 9/2019 | Aus Der Fuenten et al. |
| 2005/0132892 A1 | 6/2005 | Hall |
| 2006/0230941 A1 | 10/2006 | Ryser et al. |
| 2007/0245901 A1 | 10/2007 | Blanc et al. |
| 2008/0245236 A1 | 10/2008 | Ternite et al. |
| 2010/0018404 A1* | 1/2010 | Villa .................. A47J 31/46 99/288 |
| 2010/0116142 A1* | 5/2010 | Versini .............. A47J 31/3628 99/295 |
| 2010/0147155 A1 | 6/2010 | Rapparini |
| 2011/0011272 A1* | 1/2011 | Lussi ................. A47J 31/3614 99/289 R |
| 2011/0189350 A1* | 8/2011 | Van Belleghem ................ B65D 85/8043 426/81 |
| 2011/0265659 A1* | 11/2011 | Giua .................. A47J 31/3676 99/295 |
| 2011/0274802 A1 | 11/2011 | Rivera |
| 2012/0180741 A1 | 7/2012 | Strey et al. |
| 2012/0187122 A1 | 7/2012 | Glasow |
| 2012/0272830 A1* | 11/2012 | Gugerli ............... A47J 31/0668 99/295 |
| 2012/0285334 A1 | 11/2012 | DeMiglio et al. |
| 2012/0328744 A1* | 12/2012 | Nocera ............... A47J 31/3685 426/106 |
| 2013/0014648 A1 | 1/2013 | Rognon et al. |
| 2013/0064929 A1 | 3/2013 | Jarisch et al. |
| 2013/0114089 A1 | 5/2013 | Jarisch et al. |
| 2013/0129872 A1 | 5/2013 | Kruger |
| 2013/0177677 A1 | 7/2013 | Ozanne et al. |
| 2014/0130680 A1 | 5/2014 | Fin et al. |
| 2014/0150666 A1* | 6/2014 | Fin ..................... A47J 31/3633 99/295 |
| 2015/0104550 A1 | 4/2015 | Oh |
| 2015/0158665 A1 | 6/2015 | Krueger et al. |
| 2015/0238039 A1 | 8/2015 | Fischer et al. |
| 2015/0246768 A1 | 9/2015 | Talon |
| 2015/0366033 A1 | 12/2015 | Lowenthal et al. |
| 2017/0164780 A1 | 6/2017 | Hesselbrock et al. |

FOREIGN PATENT DOCUMENTS

| | | |
|---|---|---|
| CN | 101862121 A | 10/2010 |
| CN | 102066212 A | 5/2011 |
| CN | 102939253 A | 2/2013 |
| CN | 103040357 A | 4/2013 |
| CN | 103648341 A | 3/2014 |
| CN | 104661932 A | 5/2015 |
| DE | 2432141 A1 | 1/1976 |
| DE | 4192762 C2 | 1/1993 |
| DE | 693 17 455 T2 | 7/1998 |
| DE | 601 03 767 T2 | 7/2005 |
| DE | 202005021174 U1 | 6/2007 |
| DE | 102006004329 A1 | 8/2007 |
| DE | 10 2006 043 903 B3 | 2/2008 |
| DE | 102007028674 A1 | 8/2008 |
| DE | 202009009215 U1 | 10/2009 |
| DE | 10 2009 048233 A1 | 4/2010 |
| DE | 102010044251 A1 | 1/2012 |
| DE | 11 2012 001 531 T5 | 12/2013 |
| DE | 102012011204 A1 | 12/2013 |
| DE | 202013009705 U1 | 1/2014 |
| DE | 10 2012 108 653 A1 | 2/2014 |
| DE | 20 2012 012 851 U1 | 3/2014 |
| EP | 1786303 B1 | 4/2008 |
| EP | 1937118 A1 | 7/2008 |
| EP | 2112093 A1 | 10/2009 |
| EP | 2159167 A1 | 3/2010 |
| EP | 2211670 B1 | 8/2010 |
| EP | 2119385 B1 | 12/2010 |
| EP | 2276380 B1 | 1/2011 |
| EP | 2510805 A2 | 10/2012 |
| EP | 2112093 B8 | 11/2012 |
| EP | 2543290 A1 | 1/2013 |
| EP | 2543291 A1 | 1/2013 |
| EP | 2604547 A1 | 6/2013 |
| FR | 2908970 A1 | 5/2008 |
| JP | 2009-511143 A | 3/2009 |
| JP | 2011-522567 A | 8/2011 |
| JP | 2013-526316 A | 6/2013 |
| JP | 2013-533082 A | 8/2013 |
| JP | 2015525588 A | 9/2015 |
| WO | 2006137737 A2 | 12/2006 |
| WO | 2007087890 A1 | 8/2007 |
| WO | 2009050540 A1 | 4/2009 |
| WO | 2010026053 A1 | 3/2010 |
| WO | 2011/077349 A2 | 6/2011 |
| WO | 2011141532 A1 | 11/2011 |
| WO | 2011141535 A1 | 11/2011 |
| WO | 2012062842 A1 | 5/2012 |
| WO | 2013008140 A2 | 1/2013 |
| WO | 2013038111 A2 | 3/2013 |
| WO | 2013166615 A1 | 11/2013 |
| WO | 2013188246 A2 | 12/2013 |
| WO | 2014001564 A1 | 1/2014 |
| WO | 2014016208 A1 | 1/2014 |
| WO | 2014020492 A1 | 2/2014 |
| WO | 2014128205 A1 | 8/2014 |
| WO | 2014153659 A1 | 10/2014 |
| WO | 2014/206991 A1 | 12/2014 |
| WO | 2014202694 A1 | 12/2014 |
| WO | 2015006367 A2 | 1/2015 |
| WO | 2015055849 A1 | 4/2015 |
| WO | 2016005352 A1 | 1/2016 |

OTHER PUBLICATIONS

International Search Report for PCT/EP2015/062361, dated Aug. 7, 2015, and English Translation thereof.
Written Opinion for PCT/EP2015/062361, dated Aug. 7, 2015, and English Translation thereof.
German Search Report for DE 10 2014 109 761.0, dated Mar. 10, 2015.

(56) References Cited

OTHER PUBLICATIONS

Chinese Search Report in corresponding Chinese Patent Application No. 2015800372609, date unknown, 2 pages.
Indian Search Report and Examination in related Indian Patent Application No. 201747004526, dated Nov. 20, 2019, 7 pages with English Translation.
Fourth Chinese Office Action in corresponding Chinese Patent Application No. 201580037684.5, dated Apr. 24, 2020, 7 pages English Translation.
Korean Search Report in corresponding Korean Patent Application No. UAE/P/ 130712016, date unknown, 10 pages in English.
First Chinese Office Action in related Chinese Patent Application No. 201580037684.5, dated Jan. 4, 2019, 9 pages.
Second Chinese Office Action in related Chinese Patent Application No. 201580037684.5, dated Aug. 6, 2019, 10 pages.
Third Chinese Office Action in related Chinese Patent Application No. 201580037684.5, dated Jan. 13, 2020, 11 pages.
Merriam-Webster definition of "mechanism", Dated Sep. 14, 2019.
Merriam-Webster definition of "machinery", Dated Sep. 14, 2019.
Office Action dated Mar. 11, 2019, in Japanese Patent Application No. 2017-502717.
English Translation of German Search Report for DE 10 2014 109 760.2, dated Mar. 10, 2015.
International Search Report for PCT/EP2015/062360, dated Sep. 16, 2015, and English Translation thereof.
Written Opinion for PCT/EP2015/062356, dated Sep. 16, 2015, and English Translation thereof.
German Search Report for DE 10 2014 109 760.2, dated Mar. 10, 2015.
Search Report dated Jul. 9, 2018 for European Patent Application No. 18 17 0003.
Search Report completed Jul. 28, 2017 for Singapore Patent Application No. 11201610833R.
Merriam-Webster definition of "extend", Dated Dec. 21, 2019.
Indian Examination Report in related Indian Patent Application No. 201747004526, dated Nov. 20, 2019, 7 pages with English translation.

\* cited by examiner

APPARATUS AND METHOD FOR PREPARING A BREWED BEVERAGE

CROSS-REFERENCE TO RELATED APPLICATIONS

This application is a U.S. National Stage Application of International Patent Application No. PCT/EP2015/062361, filed Jun. 3, 2015, which claims benefit of German Patent Application No. 10 2014 109 761.0, filed Jul. 11, 2014.

TECHNICAL FIELD

The present invention relates to an apparatus for preparing a brewed beverage, comprising a device for heating and delivering water, a brewing chamber into which the heated water is introduced, a positioning device for positioning a capsule, having an ingredient for brewing a beverage, at a lateral opening of the brewing chamber, and an outlet with a switchable valve on a bottom side of the brewing chamber, as well as a method for preparing a brewed beverage.

BACKGROUND OF THE INVENTION

An apparatus for producing a brewed beverage has been disclosed in EP 2 159 167, in which the capsule is arranged adjacent to a brewing chamber in which the brewed beverage can remain for a specific infusion time. The capsule is pierced on the rear side for the brewing process and a liquid is then injected via a needle, which can then flow through a screen on a side of the capsule into the brewing chamber. This brewing apparatus can operate in a substantially pressureless manner and can also be used for producing tea. It is disadvantageous however that the capsule is damaged by piercing it and leakage flows can occur at a specific filling level. Furthermore, tea can adhere to the tip protruding into the capsule, which soils the brewing chamber and optionally the brewing beverage for the next brewing process. The cleaning of the brewing chamber via the injection needle is only possible with difficulty because only a portion of the brewing chamber can be rinsed.

SUMMARY OF THE INVENTION

It is therefore the object of the present invention to provide an apparatus and a method for preparing a brewed beverage in which tea can also be effectively prepared and convenient operation is ensured.

The above and other objects are achieved, in one embodiment, by an apparatus for preparing a brewed beverage, including: a device for heating and conveying water; a brewing chamber coupled to the device to introduce the heated water into the brewing chamber, the brewing chamber having a lateral opening and a bottom side having an outlet; a positioning device for positioning at the lateral opening of the brewing chamber a capsule containing an ingredient for brewing the beverage; and a drive device arranged to move the brewing chamber relative to the capsule.

According to another aspect of the invention, there is provided in another embodiment, a method for preparing a brewed beverage, including the following steps: positioning a capsule containing an ingredient for brewing a beverage at a lateral opening on a brewing chamber; heating and conveying water to the brewing chamber; introducing the heated water into the brewing chamber; filling the capsule with the heated water and preparing the beverage over a brewing time of a brewing process in the brewing chamber; opening a valve after the brewing time and filling a vessel with the brewed beverage from the brewing chamber; and after each brewing process ejecting the capsule from the lateral opening of the brewing chamber and carrying out an automatic rinsing of the brewing chamber.

A drive device is provided in the apparatus in accordance with the invention by means of which the brewing chamber is movable. The user can wait after starting a brewing process until the apparatus dispenses the brewed beverage, wherein the apparatus can automatically select the parameters for preparing the brewed beverage. A sealing with the capsule and/or an ejection of the capsule can occur via the drive device in a simple manner without the user having to carry out any further operating steps. After the displacement of the brewing chamber, it can be cleaned automatically.

The brewing chamber is preferably linearly displaceable relative to the capsule. The brewing chamber can be moved between an insertion position in which the capsule can be inserted in an insertion chute into the brewing chamber and can be positioned adjacent to the opening, a brewing position at which an edge of the capsule rests in a sealed manner on the opening of the brewing chamber, and an ejection and rinsing position where the capsule is detached from the brewing chamber. The different positions can be accessed automatically via the drive device.

A filler neck is preferably arranged in the brewing position above a passage for filling the vessel and in a rinsing position spaced from the passage above a guide element for collecting rinsing liquid. Rinsing can thus be carried out automatically after the brewing process, wherein it is prevented that rinsing liquid reaches the vessel which is optionally still arranged beneath the passage. The rinsing liquid is automatically filled via the guide element in the collecting container as a result of the displacement of the brewing chamber and the filler neck. Automatic rinsing can thus also occur following a short period after the brewing process. All parts wetted with tea are rinsed during the rinsing process, i.e. the lines, valves and the brewing chamber in particular.

The drive device and the brewing chamber can be arranged on opposite sides of the capsule for achieving a compact configuration. The drive device thus does not protrude toward the front side of the apparatus on which the vessel is to be removed after the preparation of the brewed beverage. Furthermore, the retaining means can be subjected to tensile loading, which promotes the sealing of the capsule and brewing chamber.

The drive device can comprise an electric motor for precise displacement of the brewing chamber, which electric motor drives a spindle or a spindle nut.

Other linear drives can also be used for displacing the brewing chamber.

In a further embodiment of the invention, a switchable valve is provided on an outlet of the brewing chamber and an inlet on an upper side of the brewing chamber for introducing hot water. Gravity can thus be used to ensure the brewing process with a specific infusion time within the brewing chamber and automatic filling of the vessel disposed underneath on the one hand, and also to carry out a rinsing process on the other hand without leakage flows occurring from the device. The lateral opening of the brewing chamber can be arranged above a collecting container during the rinsing process, so that during the output of rinsing liquid via the opening it can be conducted directly into the collecting container.

In accordance with the invention, a method for preparing a brewed beverage is also provided, wherein a valve is opened after a waiting period after the brewing process, e.g. after at least 30 seconds or after a waiting period of one or several minutes, and a vessel is filled with a brewed beverage. After the brewing process, the capsule is ejected by means of the drive device and an automatic rinsing process is carried out. As a result, the apparatus offers a high level of hygiene because surface drying of tea for example is prevented and the rinsing process can be carried out in an automated manner directly after the brewing process, but not later than 30 seconds after the brewing process.

A stop is preferably provided adjacent to the brewing chamber, so that the stop can be used by the displacement of the brewing chamber in order to forcibly detach the capsule from a seal adjacent to the lateral opening of the brewing chamber, since it may occur during prolonged infusion times that the capsule attaches to the seal so that the stop ensures a forced release.

BRIEF DESCRIPTION OF THE DRAWINGS

The invention will be explained below in closer detail by reference to an embodiment shown in the enclosed drawings, wherein.

DETAILED DESCRIPTION OF THE INVENTION

Figure 1:
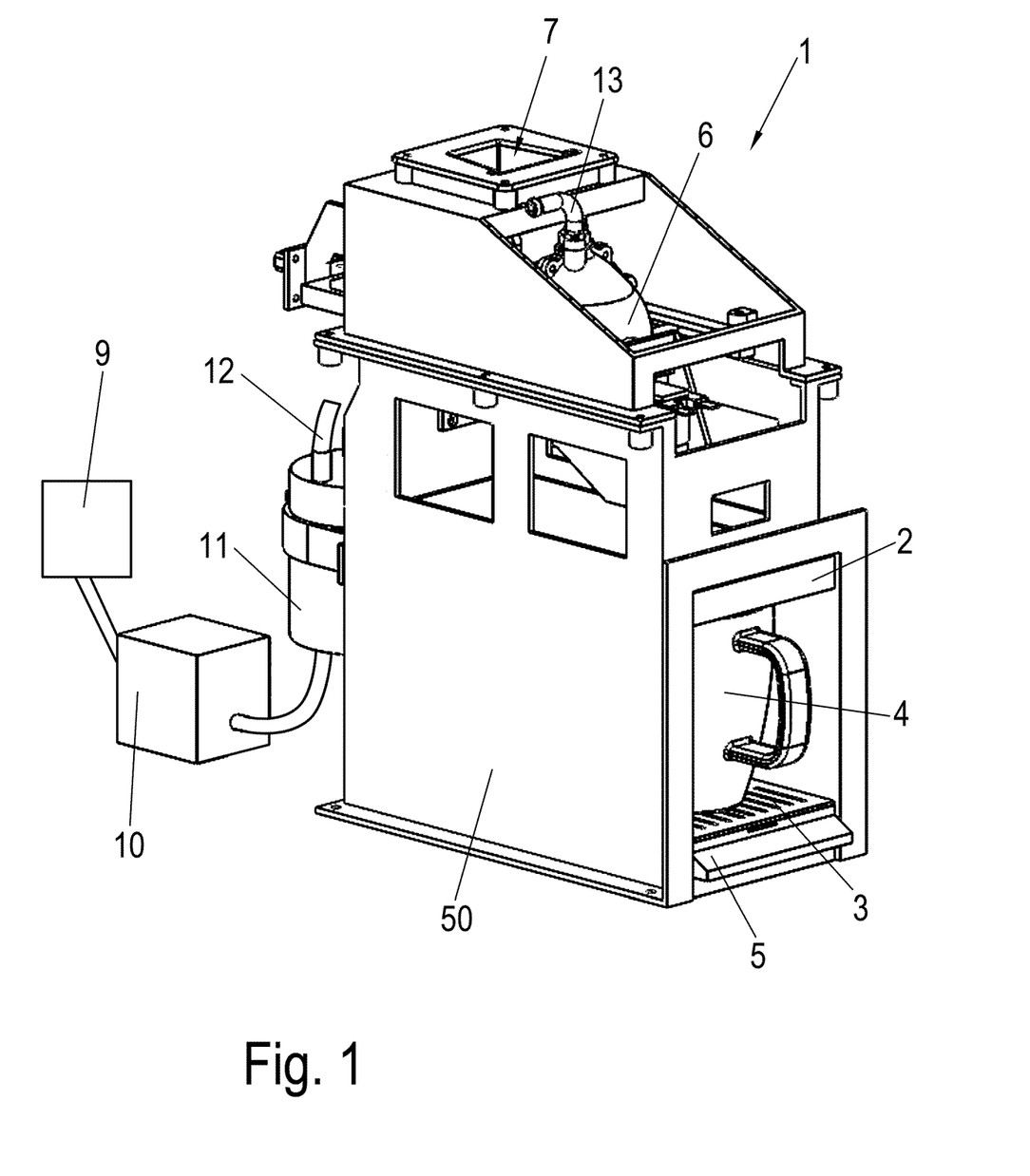
FIG. 1 shows a perspective view of an apparatus for preparing a brewed beverage.

An apparatus 1 for preparing brewed beverages comprises a removable collecting container 2 which is arranged in a housing 50. The collecting container 2 preferably consists of two parts: a container with a water-permeable base for accommodating capsules and a container underneath for collecting water. A support 3 with openings for depositing a vessel 4 is arranged on the collecting container 2. A gripping section 5 for pulling out the collecting container 2 is provided beneath the support 3.

The apparatus 1 for preparing brewed beverages further comprises a brewing chamber 6, which is provided adjacent to an insertion chute 7 for capsules.

Figure 2:
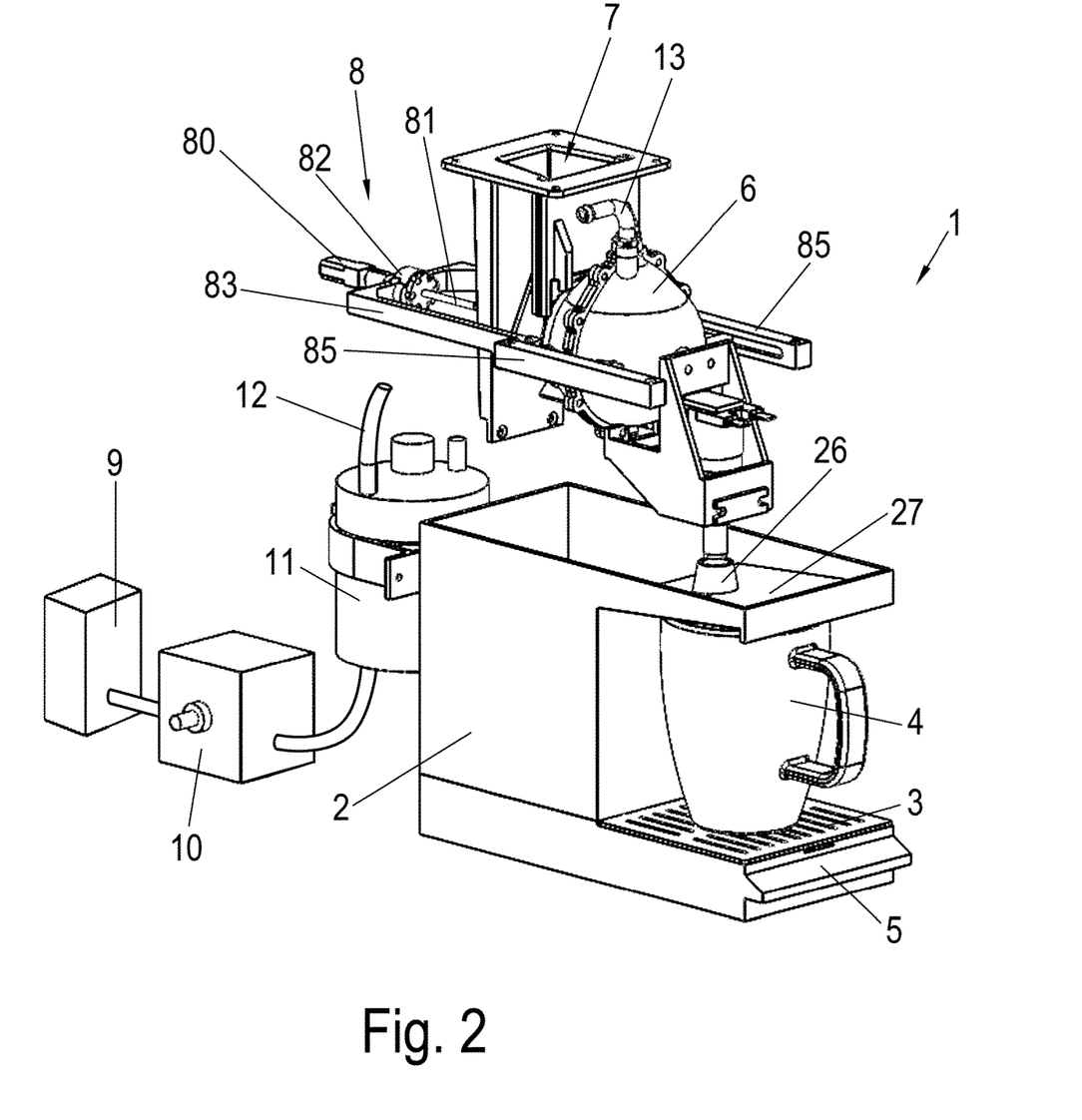
FIG. 2 shows a perspective view of the apparatus of FIG. 1 without the housing.

As is shown in FIG. 2, the insertion chute 7 for capsules is disposed between the brewing chamber 6 and a drive device 8. The brewing chamber 6 can be moved relative to the insertion chute 7 via the drive device 8. An electric motor 80 is provided for this purpose, which drives a spindle 81 via a gear, on which spindle a spindle nut 82 is mounted in a torque-proof manner. Arms 83 which are connected to the spindle nut 82 are displaced linearly by rotation of the spindle 81. The arms 83 engage around the brewing chamber 6 on opposite sides and are guided on linear guides 85. The guide 85 can be formed as a groove or rail for example. The brewing chamber 6 is thus linearly movable.

The apparatus 1 for preparing brewed beverages further comprises a schematically shown tank 9 for freshwater, which can be formed in a removable manner. The tank 9 is provided with a pump 10, via which a heating device 11 in form of a boiler is supplied. A line 12, which is only partly shown in FIG. 2, leads from the heating device 11 to an inlet line 13 above the brewing chamber 6. A filter can optionally also be provided between the inlet line 13 and the tank 9.

Figure 3:
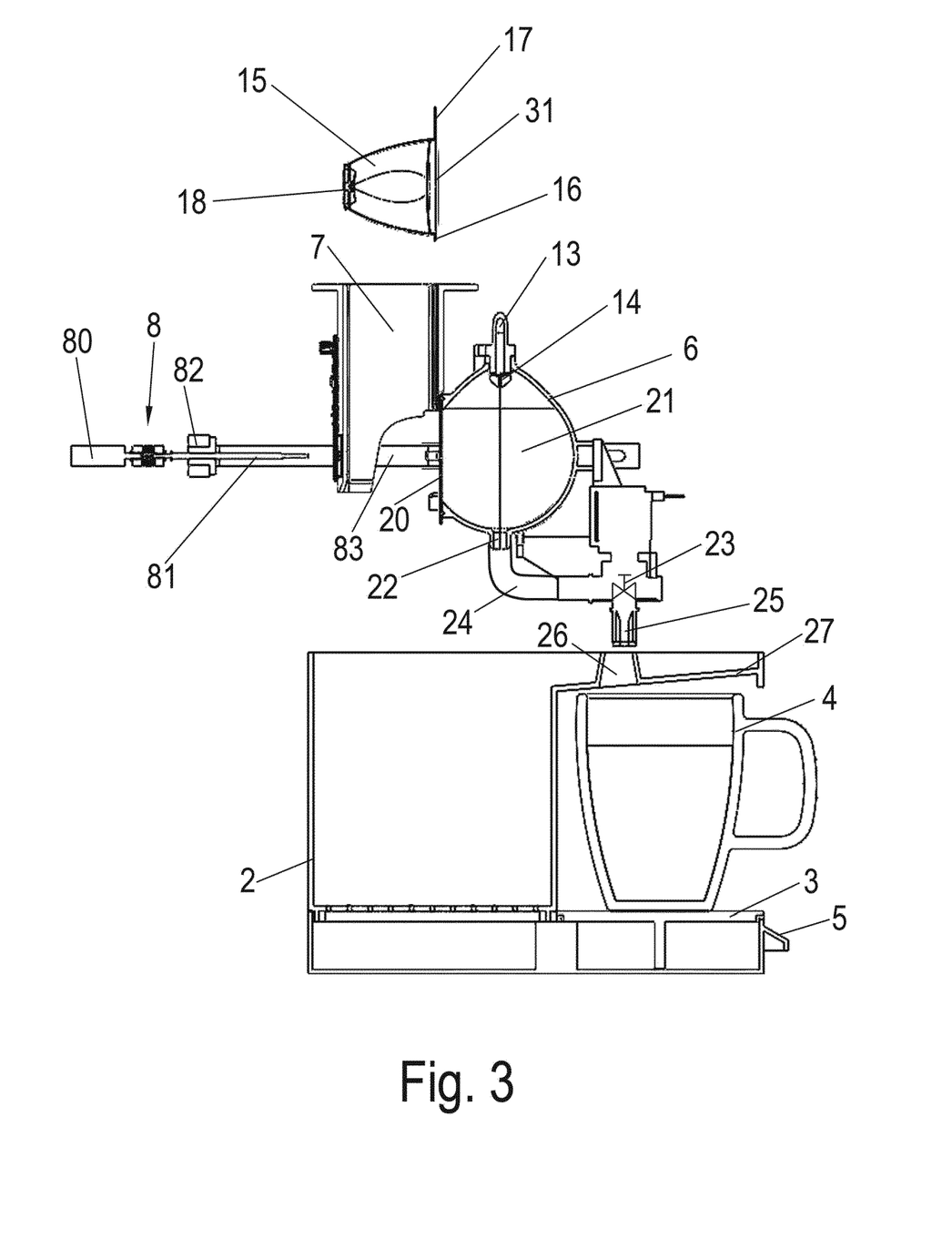
FIG. 3 shows a sectional view of the apparatus of FIG. 1 without the housing prior to the insertion of the capsule.

FIG. 3 shows the apparatus 1 in detail. A capsule 15 is provided above the insertion chute 7, which capsule is formed in a cup-like manner and comprises an opening on one side which is sealed with a screen 31. The screen 31 is fixed to an edge 16 which is formed in an asymmetric manner and comprises a protruding section 17 as a gripping region. As a result of guide means on the base of the capsule 15 which are also asymmetric, said capsule is thus inserted in a predetermined position and orientation into the insertion chute 7, which comprises a respective recess with guide means for the positioning of the capsule 15. On the side opposite the opening, the capsule 15 comprises a base 18 on which markings are arranged for identifying the capsule 15. Such markings can be formed as a colour coding, optical coding, electromagnetic coding or in any other way in order to identify a specific type of capsule in a predetermined position. By reading the coding of the capsule 15 on the apparatus, the filling quantity of hot water for the brewing chamber 6, the temperature and the brewing time can be set via the controller. The control of other parameters via the coding is also possible.

Figure 4:
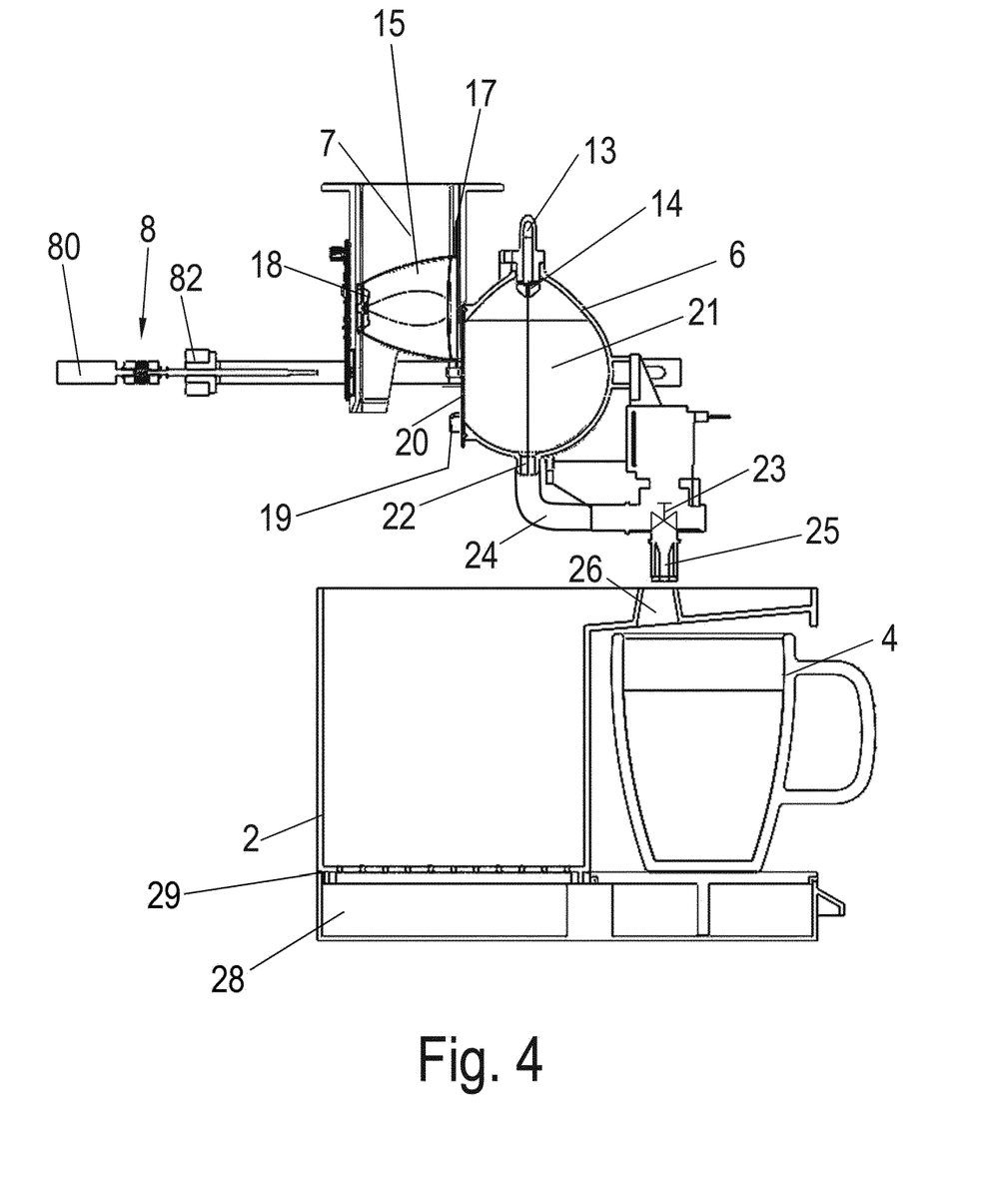
FIG. 4 shows a sectional view of the apparatus of FIG. 1 without the housing during insertion of the capsule.
Figure 5:
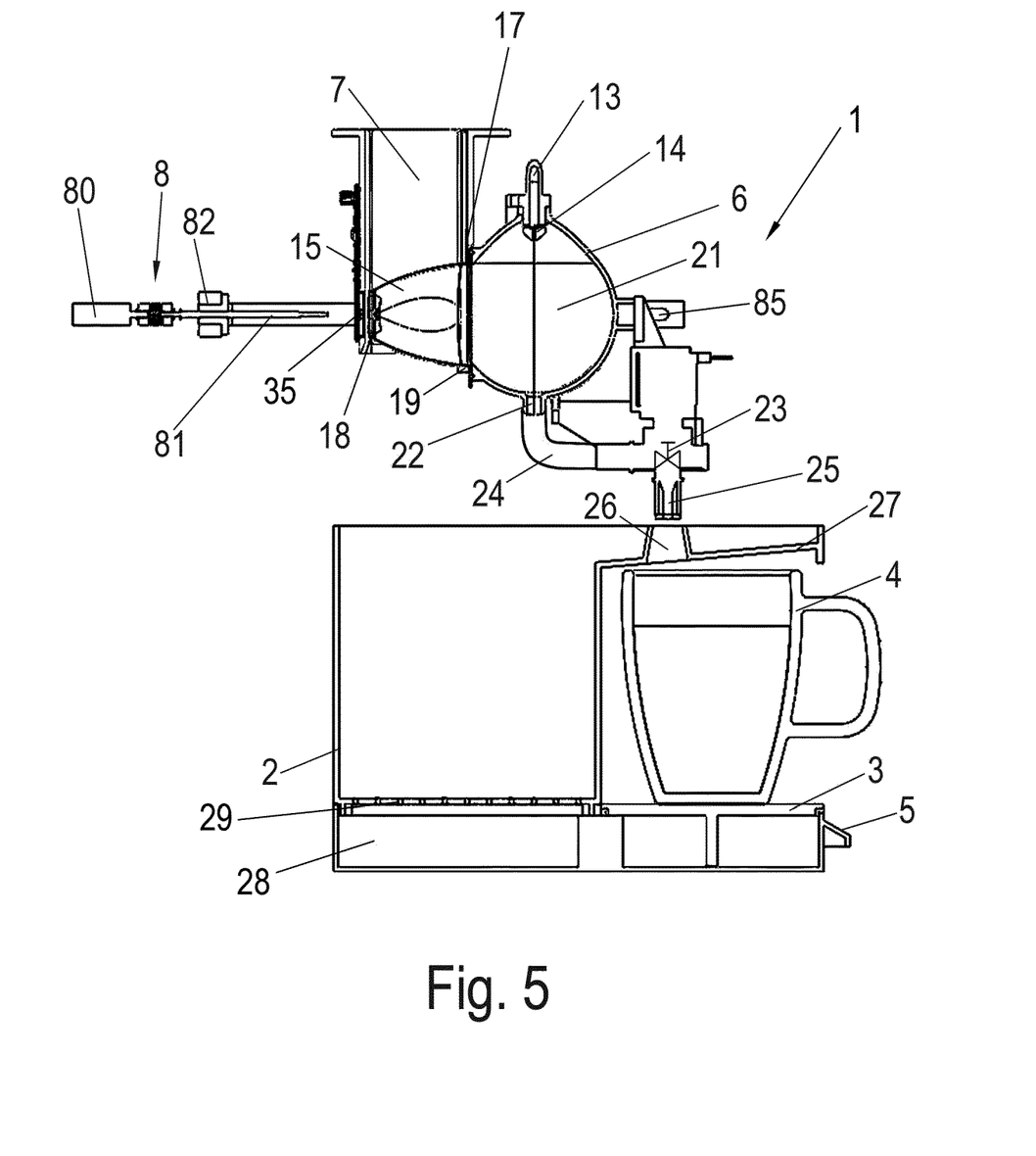
FIG. 5 shows a sectional view of the apparatus of FIG. 1 with the capsule in the brewing position.

The capsule 15 is inserted at first into the insertion chute 7 for the brewing process, as shown in FIG. 4. The capsule 15 slides downwardly until it is arranged at a lateral opening 20 of the brewing chamber 6. Retainers 19 are provided for this purpose on the exterior side of the brewing chamber 6, which retainers prevent that the capsule 15 slips in the downward direction beyond the position shown in FIG. 5. FIG. 5 shows the brewing position to which the brewing chamber 6 is moved after the insertion of the capsule 15. The spindle 81 is twisted for this purpose by the electric motor 80 in order to move the arms 83 along the guide 85 in FIG. 5 to the left, and in order to thus press a seal adjacent to the opening 20 at the brewing chamber 6 against the edge 16 of capsule 15 and to ensure sealing. The capsule 15 and an interior space 21 of the brewing chamber 6 thus form a unit, wherein the interior space 21 of the brewing chamber 6 and the interior of the capsule 15 are separated from each other by the screen 31. The interior space 21 of the brewing chamber 6 is several times larger than an interior space of the capsule 15, e.g. more than four times as large, so that the brewed beverage is mainly disposed in the brewing chamber 6 and only a minor portion in the capsule 15, which simplifies the dispensing of the brewed beverage.

In the brewing position, hot water is introduced via the inlet line 13 from the heating device 11 into the brewing chamber 6, for which purpose a nozzle 14 is provided at the end of the inlet line 13 which protrudes with a tip into the interior space 21 of the brewing chamber 6. The brewing chamber 6 comprises an outlet 22 at the bottom end, which outlet is connected via a line 24 to a valve 23. The introduced hot water is collected in the brewing chamber 6 by closing the valve 23 and rises over the outlet 22 in order to reach the material contained in the capsule 15 for brewing a beverage, especially tea. The preparation of the brewed beverage can be adjusted individually via the controller by previous reading of the coding on the capsule 15 via a reader device 35, e.g. green tea can be prepared differently than black tea, fruit tea or any other brewed or infusion beverage. Furthermore, a cleaning or service program can be started by reading the coding.

The valve 23 can be opened after the brewing process so that the brewed beverage flows from the brewing chamber 6 via the outlet 22 and the line 24 into an outlet nozzle 25, from where it is introduced into a vessel 4. A passage 26 or an opening is disposed between the outlet nozzle 25 and the vessel 4, so that the hot beverage can flow without obstruction into the vessel 4. The valve 23 can be closed again after the preparation of the brewed beverage.

Figure 6:
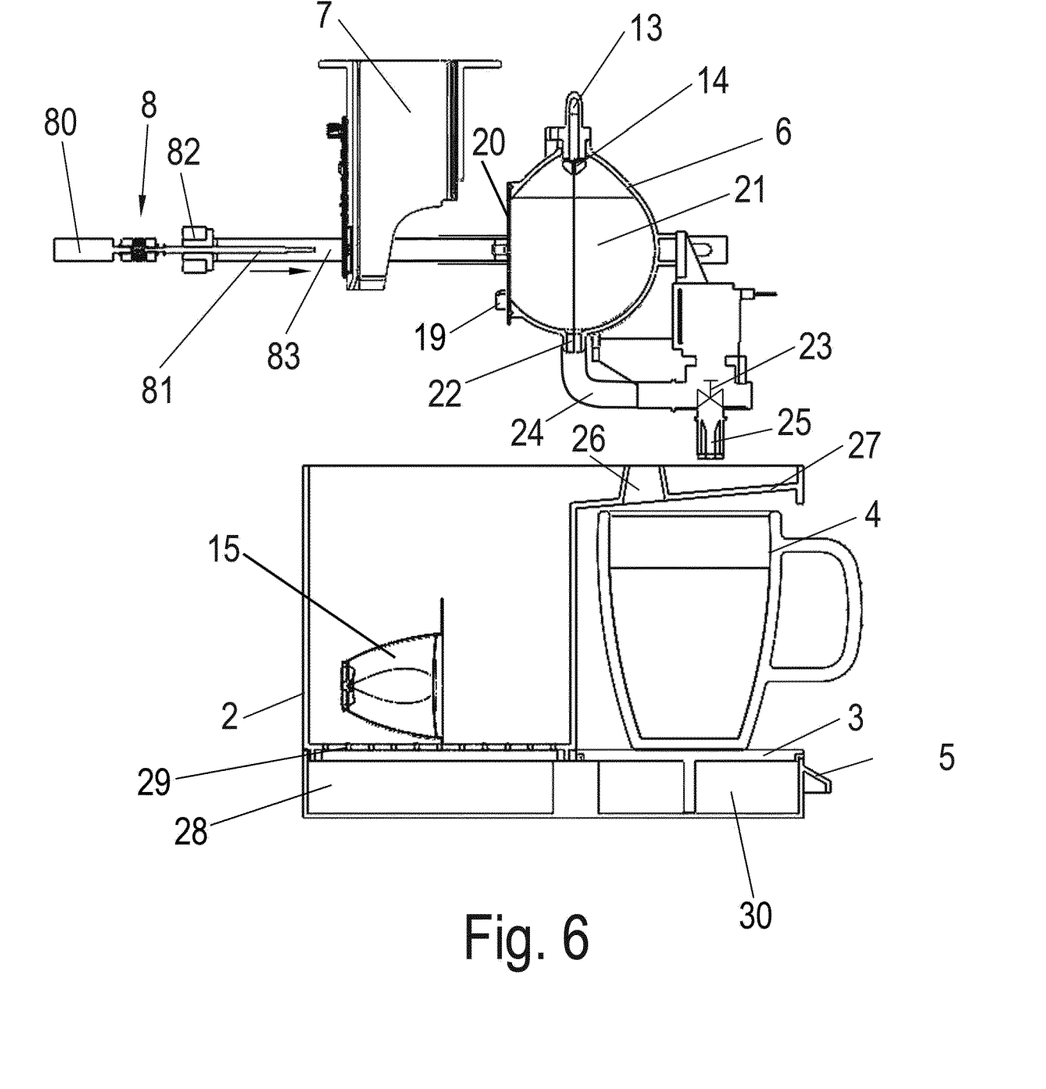
FIG. 6 shows a sectional view of the apparatus of FIG. 1 after the ejection of the capsule in a rinsing position.

After the brewing process, the brewing chamber 6 can be displaced via the drive device 8 according to the arrow in FIG. 6 so that the capsule 15 is removed from the holding position adjacent to the lateral opening 20 on the brewing chamber 6 and drops in the downward direction. The capsule 15 drops into the collecting container 2 and onto a screen 25 or a grate which is arranged above a collecting basin 28. The displacement of the brewing chamber 6 simultaneously also displaces the line 24 and the outlet nozzle 25, which is now no longer arranged above the passage 26 but above a guide element 27. The brewing chamber 6 can now be rinsed, in that hot water is injected from the heating device 11 via the nozzle 14 into the brewing chamber 6, so that the hot water can remove residues of the brewing process. The hot water can be partly introduced through the opening 20 into the collecting container 2 in a direct manner and is introduced otherwise via the outlet 22 and the line 24 into the outlet nozzle 25. The rinsing water then reaches the guide element 27 from there, which is formed as a sloping surface above the vessel 4. The rinsing water reaches the collecting basin 28 of the collecting container 2 via the guide element 27. The guide element 27 can also be formed as a channel or a groove instead of a sloping surface.

If after the removal of the vessel 4 a small quantity of liquid is introduced through the passage 26, this liquid can be collected in a second collecting basin 30 or a drip tray beneath the screen 31. The collecting container 2 can be removed as a unit from the housing 50 of the apparatus 1 so that the two collecting basins 28 and 30 on the collecting container 2 can be emptied. Furthermore, the collecting container 2 above the screen 29 is removable so that the used capsules 15 can also be emptied in a simple way.

Figure 7:
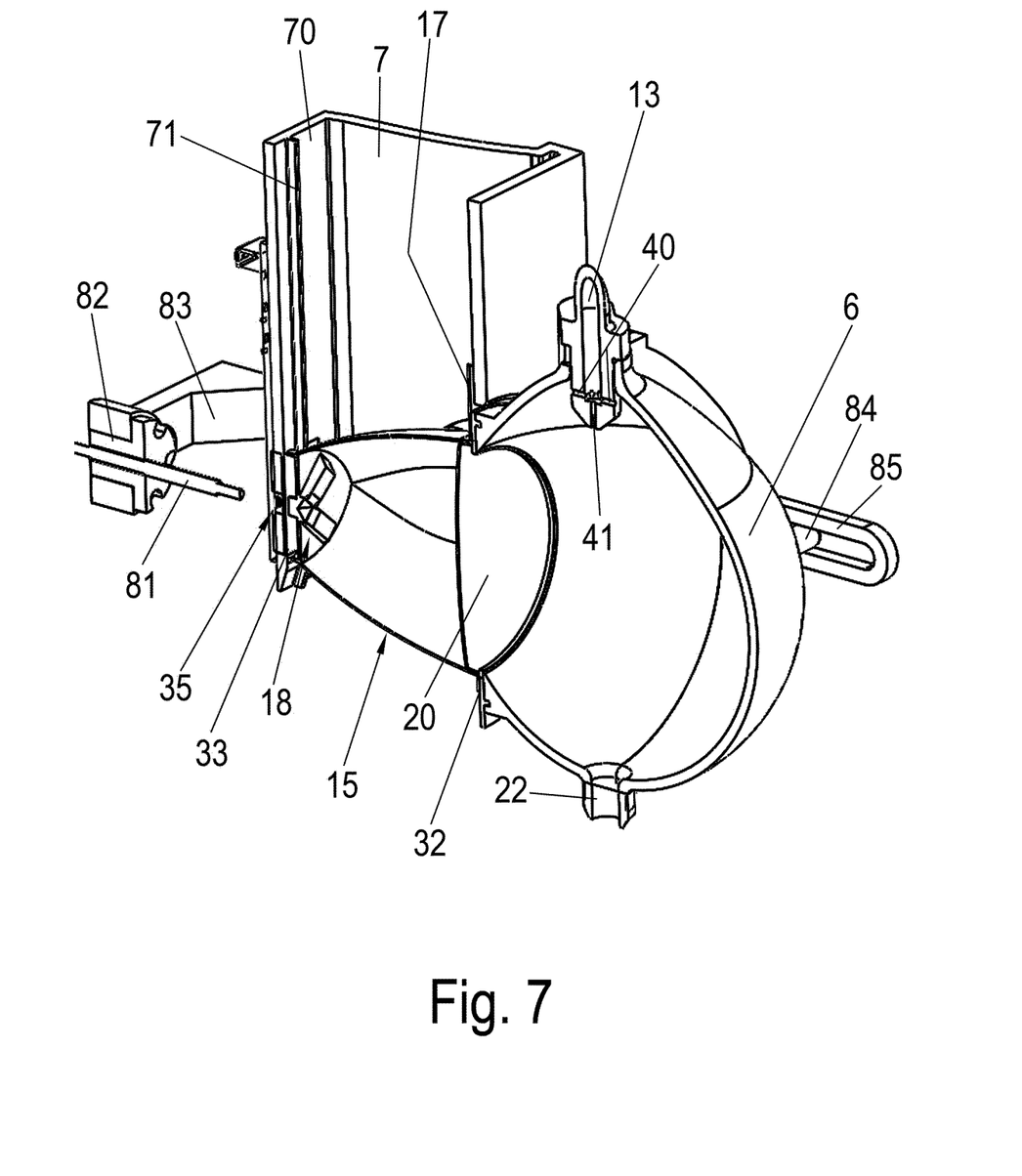
FIG. 7 shows a perspective detailed view of the brewing chamber of the apparatus of FIG. 1 with the capsule in the brewing position.

FIG. 7 shows the brewing chamber 6 in detail. The nozzle 14 is situated on the upper side of the brewing chamber 6, by means of which hot water is introduced for the brewing process or for the rinsing process. For this purpose, the nozzle 14 comprises several openings 40 which are distributed over the circumference, through which the hot water can be injected into the brewing chamber 6. A liquid film is thus formed on the side walls of the brewing chamber 6, which can be used on the one hand for rinsing and on the other hand for the brewing process. Furthermore, an opening 41 is provided downwardly on the nozzle 14 through which hot water can be injected, e.g. when hot water needs to be refilled during the brewing process. The openings 40 and 41 can also be formed to be optionally switchable via valves. Alternatively, the opening 41 can also be formed in the direction of the capsule instead of perpendicularly in the downward direction.

The brewing chamber 6 is formed in a substantially spherical way and comprises a parabolic section in the upper region on which the nozzle 14 is provided.

The brewing chamber 6 comprises retainers 84 or pins on its exterior side which are mounted in the guide 85.

The brewing chamber 6 can accommodate a volume of between 0.1 l to 1.0 l, especially 0.15 l to 0.7 l, depending on the number of portions of the brewed beverage that need to be prepared at once.

Figure 8:
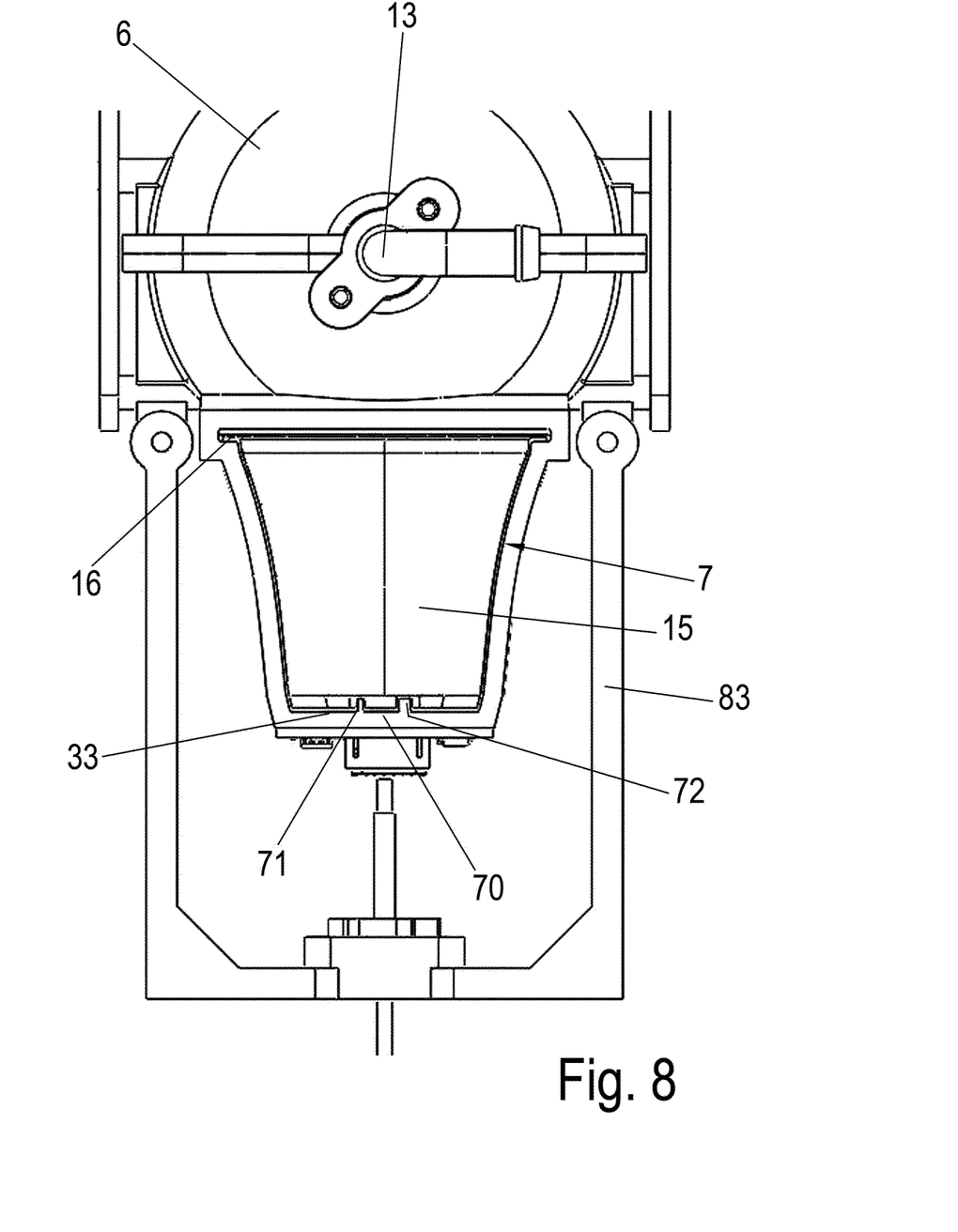
FIG. 8 shows a top view of the insertion chute of the apparatus of FIG. 1.

Furthermore, FIGS. 7 and 8 show that the insertion chute 7 comprises a surface 70 on the side of the base 18 of the capsule 15, from which a first guide strip 71 and a second guide strip 72 protrude. The guide strips 71 and 72 have a different width and are arranged asymmetrically in relation to a central plane of the capsule 15 so that the capsule 15 can only be inserted into the insertion chute 7 in a predetermined position.

A base area 33 with grooves for accommodating the guide strips 71 and 72 are provided at the height of the lateral opening 20 adjacent to the base 18 of the capsule 15, on which the capsule 15 is supported after insertion when the capsule 15 rests on the positioning means 19. It is thus prevented in the insertion position and the brewing position that the capsule 15 can drop into the insertion chute 7. If the brewing chamber 6 is moved after the brewing process and moved away from the insertion chute 7, the capsule can drop downwardly into the collecting container 2 as a result of gravity. It may occur that the capsule 15 attaches with the edge 16 to an annular seal 32 on the brewing chamber 6 and is moved together with the brewing chamber 6. In order to definitely ensure a detachment of the capsule 15, a stop can be arranged in the path of displacement of the capsule, e.g. an upwardly protruding section 17, so that the capsule 15 is released from the brewing chamber 6 after a specific amount of travel and it is ensured that the capsule 15 drops into the collecting container 2.

It is ensured by the electrical drive device 8 that the capsule 15 can be ejected automatically. A rinsing process can thus be initiated after each brewing process, so that it is prevented that the surface of the brewing chamber 6, the outlet 22 and the line 24 are soiled. The rinsing can be carried out automatically within 30 seconds for example after the brewing process, without the user having to trigger the rinsing process.

Other drive devices can also be used instead of the illustrated drive device 8 with the spindle 81, which other drive devices linearly move or also pivot the brewing chamber 6. The brewing chamber 6 can also be moved along a curve guide for example so as to be moved between an insertion position, a brewing position and an ejection or rinsing position.

Figure 9:
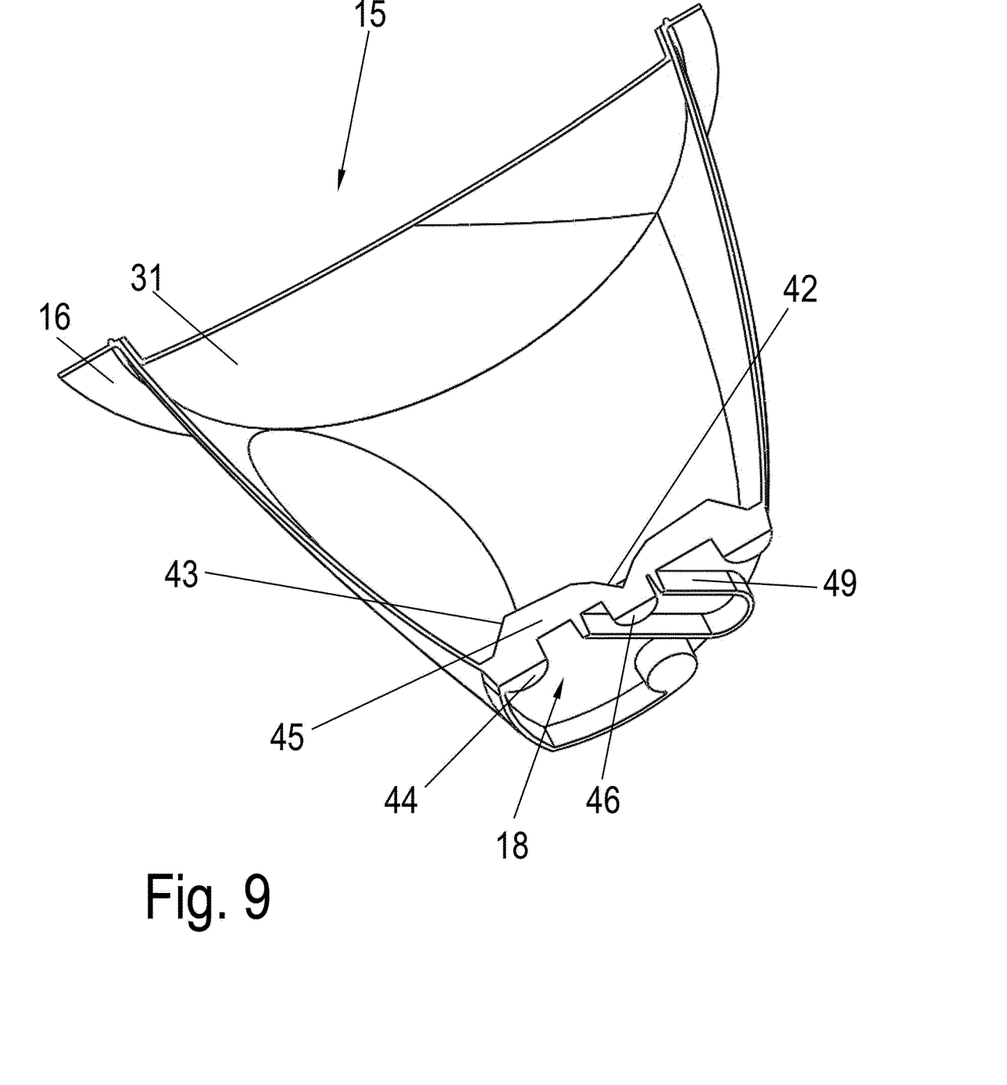
FIG. 9 shows a sectional perspective view of the capsule.

The capsule 15 is shown in FIG. 9 in a sectional view. It comprises an interior space which is sealed by a screen 31 or a grate. In order to maintain the aroma of the contents of the capsule over a longer period of time, the screen 31 or the grate can be sealed with a cover foil, which is removed entirely or partly prior to the insertion into the insertion chute 7. At least one light injection surface 46, at least one light deflection apparatus 42 and 43 and at least one light-output surface 44 are provided, which are used for an optical recognition system. Light conductors 45 are formed for this purpose on the base 18. A protruding guide profile 49 is further formed on the base, which interacts with the guide strips 71 and 72. Four light-output surfaces 44 are provided in the illustrated embodiment, on which a respective light detector detects or does not detect the emission of light. This leads to four types of coding on the base 18 of the capsule 15, so that 16 different types of capsules can be recognised. It is obviously also possible to vary the number of the light-output surfaces 44 and the light detectors 36. It is also possible to arrange the light sources and light sensors in a different way, so that the light-output surfaces 44 become the light injection surfaces and the middle light injection surface 46 becomes a light-output surface.

Figure 10:
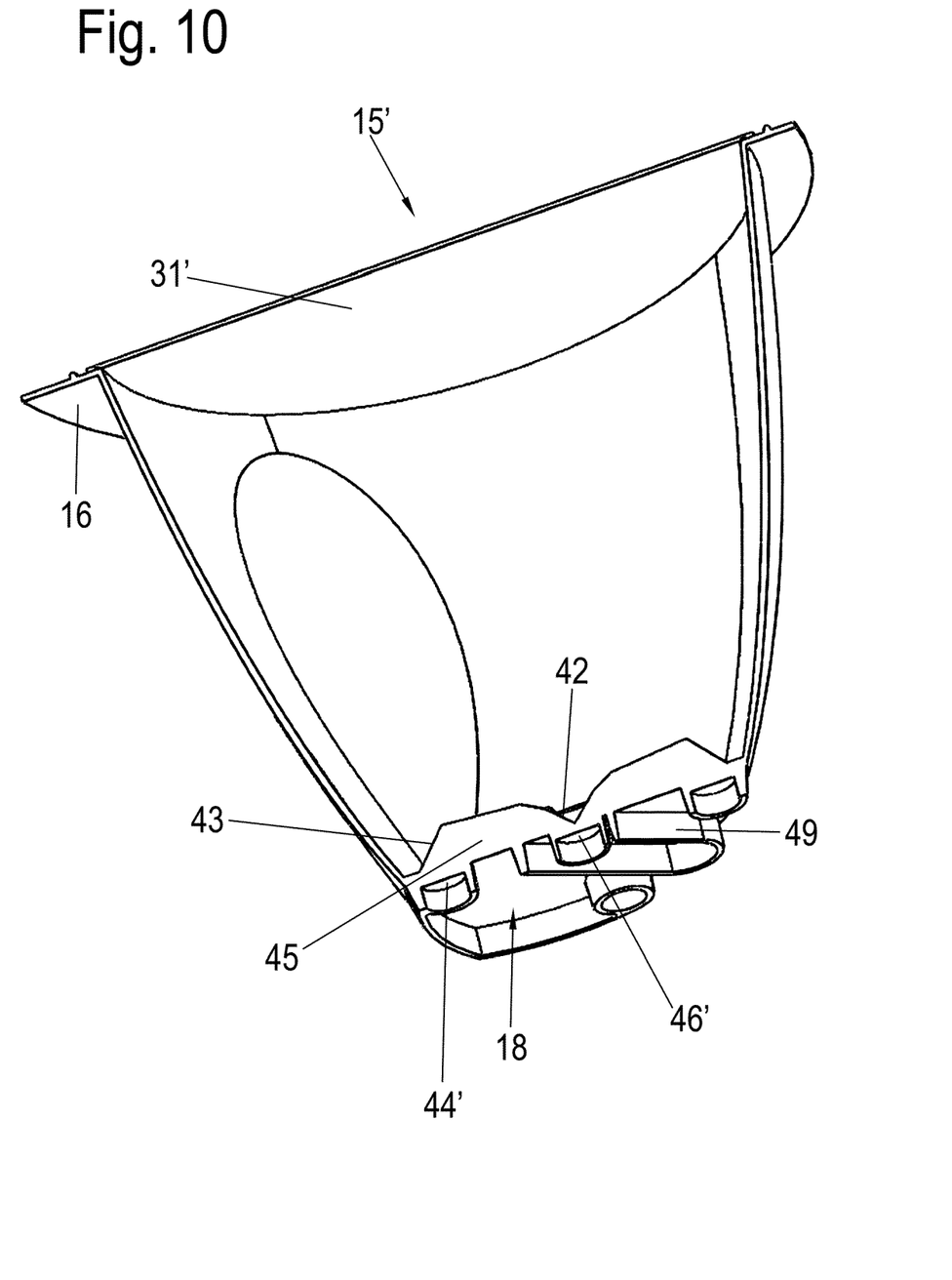
FIG. 10 shows a sectional perspective view of a further embodiment of the capsule.

FIG. 10 shows an embodiment of a capsule 15' which is modified over that of FIG. 9. Capsule 15' comprises four light-output surfaces 44' and one light injection surface 46' on the base, which are each arranged in a protective manner in a cup-shaped receptacle. The light-output and injection surfaces 44' and 46' which are oriented parallel to the surface of the base 18 are thus arranged in a protective manner by a downwardly protruding ring. Furthermore, a screen 31' is fixed to the upper edge 16 of the capsule 15'.

In the illustrated embodiment, the brewing chamber 6 is formed with a single wall, e.g. made of plastic, metal or glass. It is also possible to insulate the brewing chamber 6 for the purpose of increasing temperature stability, e.g. with a casing made of insulating material or by a formation with a double wall. In this case, the brewed beverage can also be output in a sufficient tempered manner even in the case of long brewing times of more than 5 minutes for example.

LIST OF REFERENCE NUMERALS

1 Apparatus
2 Collecting container
3 Support
4 Vessel
5 Gripping section
6 Brewing chamber
7 Insertion chute
8 Drive device
9 Tank
10 Pump
11 Heating device
12 Line
13 Inlet line
14 Nozzle
15 Capsule
16 Edge
17 Section
18 Base
19 Retainer
20 Opening
21 Interior space
22 Outlet
23 Valve
24 Line
25 Outlet nozzle
26 Passage
27 Guide element
28 Collecting basin
29 Screen
30 Collecting basin
31 Screen
32 Seal
33 Projection
35 Reader device
40 Opening
41 Opening
42 Light deflection apparatus
43 Light deflection apparatus
44 Light-output surface
45 Light conductor
46 Light injection surface
49 Guide profile
50 Housing
70 Surface
71 Guide strip
72 Guide strip
80 Electric motor
81 Spindle
82 Spindle nut
83 Arm
84 Retainer
85 Guide

The invention claimed is:

1. An apparatus for preparing a brewed beverage, comprising:
a device for heating and conveying water:
a brewing chamber having; an inlet line with one end coupled to the device and another end coupled to an upper region of the brewing chamber for introducing hot water directly into the brewing chamber, a lateral opening and a bottom side having an outlet;
a positioning device including an insertion chute into which a capsule containing an ingredient for brewing the beverage and having one end with an edge around an opening, is insertable and slidable to a position adjacent the lateral opening of the brewing chamber, the insertion chute being adapted to house the capsule entirely outside of the brewing chamber during a brewing process in the brewing chamber for preparation of a brewed beverage; and
a drive device connected to the brewing chamber to move the brewing chamber relative to the insertion chute in a horizontal direction between:
1) an insertion position in which the edge at the one end of the capsule in the insertion chute is positioned adjacent to and spaced from the lateral opening of the brewing chamber,
2) a brewing position in which the edge at the one end of the capsule forms a seal around the lateral opening of the brewing chamber such that during the brewing process the lateral opening is the sole passage for heated water into and out of the capsule of the capsule, and
3) an ejection and rinsing position in which the capsule is removed from the lateral opening on the brewing chamber and is allowed to drop in a downward direction.

2. The apparatus according to claim 1, wherein the drive device is adapted to move the brewing chamber linearly relative to the capsule.

3. The apparatus according to claim 1, further comprising a outlet nozzle and a guide element, wherein the outlet nozzle is arranged in the brewing position above a passage for filling a vessel with the brewed beverage and in the ejection and rinsing position arranged spaced from the passage above the guide element for collecting a rinsing liquid.

4. The apparatus according to claim 1, wherein the drive device and the brewing chamber are arranged to be on opposite sides of the capsule.

5. The apparatus according to claim 1, wherein the drive device comprises a spindle or a spindle nut, and an electric motor arranged to drive the spindle or the spindle nut.

6. The apparatus according to claim 1, wherein the brewing chamber has an upper side coupled to the inlet line for introducing the heated water and the outlet includes a switchable valve.

7. The apparatus according to claim 1, further comprising a collecting chamber, wherein the lateral opening is arranged above the collecting chamber.

8. The apparatus according to claim 7, wherein the collecting chamber comprises a collecting basin for liquids and a grate or screen arranged above the collecting basin and on which used capsules are collected.

9. The apparatus according to claim 1, further comprising a stop arranged adjacent to the brewing chamber by which the capsule is removed from the seal when the brewing chamber is moved away from the insertion chute.

10. A method for preparing a brewed beverage employing the apparatus according to claim 1, comprising the following steps:
   positioning the capsule containing the ingredient for brewing a beverage at the lateral opening on the brewing chamber;
   heating and conveying water to the brewing chamber;
   introducing the heated water into the brewing chamber;
   filling the capsule with the heated water and preparing the beverage over a brewing time of the brewing process in the brewing chamber;
   opening a valve after the brewing time and filling a vessel with the brewed beverage from the brewing chamber; and
   after each brewing process ejecting the capsule from the lateral opening of the brewing chamber and carrying out an automatic rinsing of the brewing chamber.

11. The method according to claim 10, further including, during the step of carrying out the automatic rinsing, moving the brewing chamber to the ejection and rinsing position and then rinsing the brewing chamber with hot water.

12. The method according to claim 10, including arranging an outlet nozzle above a guide element for directing liquid to a collecting container when the brewing chamber is in the ejection and rinsing position.

13. The method according to claim 10, including moving the brewing chamber using the drive device from the insertion position for the capsule to the brewing position in which an edge of the capsule is clamped against the brewing chamber to form a seal around the lateral opening.

14. The apparatus according to claim 1, wherein in the ejection and rinsing position the brewing chamber is rinseable with heated water received from the device for heating and conveying water via the inlet line.

* * * * *